Sept. 1, 1970      R. E. OBENHAUS      3,526,809

OVERLOAD PROTECTION APPARATUS

Filed Aug. 28, 1967      2 Sheets-Sheet 1

Robert E. Obenhaus,
Inventor
Koenig, Senniger, Powers and Leavitt,
Attorneys

United States Patent Office 3,526,809
Patented Sept. 1, 1970

3,526,809
OVERLOAD PROTECTION APPARATUS
Robert E. Obenhaus, South Easton, Mass., assignor to Texas Instruments Incorporated, Dallas, Tex., a corporation of Delaware
Filed Aug. 28, 1967, Ser. No. 663,709
Int. Cl. H02h 5/04
U.S. Cl. 317—13                                               4 Claims

ABSTRACT OF THE DISCLOSURE

The apparatus disclosed is operative to protect an electrical load from overload conditions. The apparatus employs a coaxial current sensor having a tubular shell and an elongate electrode concentric therewith, the space between the shell and the electrode being filled with a semiconductor material having a resistance which varies with temperature. The load current is passed longitudinally through the shell thereby to heat the sensor so that the resultant variations in the resistance of the semiconductor material provides a signal when the load draws an overload current.

Overload signals provided by the sensor are applied to a heater in an electrothermal counter or integrator. The electrothermal counter includes also a thermistor which responds to the heat generated by the heater. The apparatus further includes switching means controlled by the electrothermal counter and responsive to the resistance of the counter thermistor for deenergizing the load each time the second heater is energized above a predetermined level by one of the signals and for reenergizing the load a preselected number of times after the sensor cools down following deenergization of the load and then deenergizing the load completely when the total number of signals exceeds a preselected level.

---

This invention relates to overload protection apparatus and more particularly to such apparatus which employs an electrothermal current sensor and electrothermal counter means for counting successive overload conditions.

Among the several objects of the present invention may be noted the provision of apparatus for precisely sensing the current drawn by an electrical load; the provision of such apparatus for deenergizing an electrical load under overload conditions; the provision of such apparatus having a delayed response enabling it to be used with loads such as induction motors which draw heavy current during normal starting; the provision of such apparatus which will reenergize the load a preselected number of times so that a fault may correct itself and then will permanently deenergize the load if the fault persists; the provision of such apparatus which is highly reliable; the provision of such apparatus which is relatively simple and inexpensive. Other objects and features will be in part apparent and in part pointed out hereinafter.

Briefly, apparatus according to this invention is operative to protect an electrical load from overload conditions. The apparatus includes a sensor for sensing the current drawn by the load, which sensor incorporates a resistance heater for generating an amount of heat which varies as a function of load current and also thermistor means responsive to the heat generated by the heater for providing a signal when the load draws an overload current. An electrothermal counter is provided for counting successive occurrences of the signal. The electrothermal counter includes a heater for generating heat in response to signals provided by the sensor and includes also a thermistor responsive to the heat generated by the counter heater. The apparatus further includes switching means controlled by the counter and responsive to the resistance of the counter thermistor for deenergizing the load each time the counter heater is energized above a predetermined level by one of the signals and for reenergizing the load a preselected number of times after the sensor cools down following the energization of the load whereby under overload conditions the load is deenergized and then reenergized a preselected number of times and is deenergized without being reenergized if the overload condition persists.

In one aspect of the invention, the current sensor is of coaxial construction and includes an elongate electrode, a layer of semiconductor material around the electrode, which material has a resistance which varies with temperature, and a tubular conductive shell around the layer of semiconductor material. The sensor includes also means for passing a current to be sensed through the shell thereby to heat the sensor to an extent which varies as a function of the load current whereby the resistance between the electrode and the shell through the layer of semiconductor material varies as a function of the load current.

The invention accordingly comprises the constructions hereinafter described, the scope of the invention being indicated in the following claims.

In the accompanying drawings in which one of various possible embodiments of the invention is illustrated, FIG. 1 is a block diagram of a system of the present invention for protecting an electrical load such as a motor under overload conditions;

Corresponding reference characters indicate corresponding parts throughout the several views of the drawings.

Figure 1:
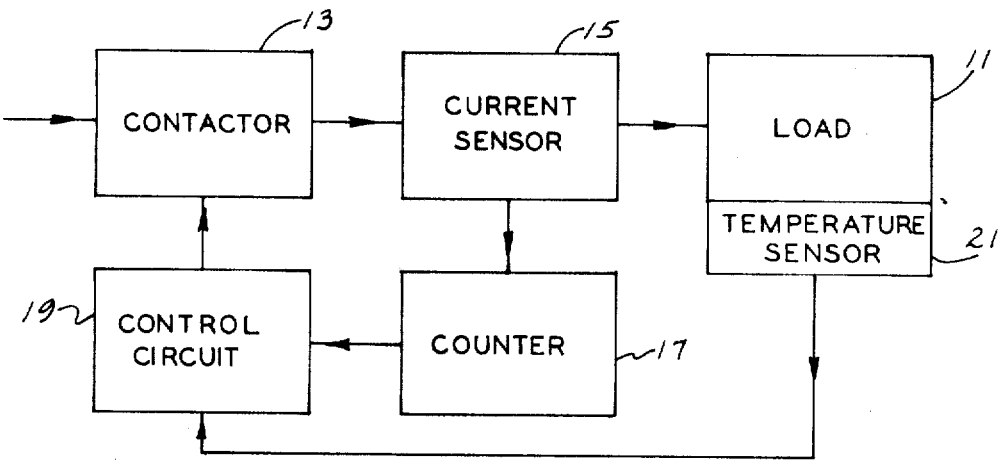

Referring now to FIG. 1, there is indicated at 11 an electrical load which is to be protected. Load 11 may, for example, comprise an induction motor which draws a heavy current upon normal starting and which should not be deenergized during such a normal start but which will continue to draw a very heavy current under stalled or locked rotor conditions and should be deenergized if such a situation occurs. The energization of load 11 is controlled by a contactor 13 in conventional manner. The current drawn by the load is measured by a current sensor indicated generally at 15 which operates, as described in greater detail hereinafter, to provide a signal when load 11 draws an overload current for a substantial length of time. The signals provided by current sensor 15 are counted by means of a counter which is indicated generally at 17 and is also described in greater detail hereinafter. A control circuit 19 controls the operation of contactor 13 and responds to the current sensor 15 and counter 17 to deenergize the load each time sensor 15 generates a signal indicating an overload condition and to reenergize the load a preselected number of times after the sensor 15 cools down following deenergization of the load. Accordingly, under overload conditions, the load 11 is deenergized and then reenergized a preselected number of times and is then deenergized without being reenergized if the overload condition persists. By providing a succession of reenergization of load 11, opportunity is given for a fault to clear itself but if the fault persists then the load 11 is deenergized to prevent damage to the load. Load 11 may further be provided with a temperature sensor as indicated generally at 21. The temperature sensing means 21 may, for example, comprise a plurality of thermistors embedded in the windings of an induction motor. Control circuit 19 preferably responds also to the temperature sensor 21 to deenergize the load if it should overheat without having drawn such an overload current as would cause sensor 15 to generate an overload signal.

Figure 2:
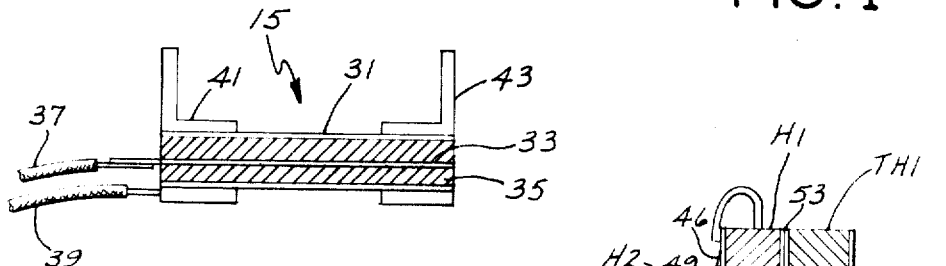
FIG. 2 is a view, partially in section, of a coaxial current sensor of this invention employed in the system of FIG. 1.

A preferred construction of current sensor 15 is illustrated in FIG. 2. As illustrated in FIG. 2, sensor 15 includes a tubular conductive shell 31 and a thin elongate electrode 33 which is coaxial within the shell. The space between shell 31 and electrode 33 is filled with a semiconductor or thermistor material 35. Material 35 is preferably of the NTC type, that is, the material has a negative temperature coefficient of resistance, and is preferably further of the type in which the resistance changes relatively abruptly at a predetermined transition temperature. In other words, there is a large change in the resistance between electrode 33 and shell 31 when the temperature of the sensor passes through a narrow range of temperatures. A pair of sensing leads 37 and 39 are connected to electrode 33 and shell 35 for obtaining a signal when the temperature of the sensor crosses the aforesaid threshold. Since material 35 is of the NTC type the signal in this example is constituted by a rise in current through the material above a given level. A pair of terminals 41 and 43 are connected to opposite ends of the conductive shell 31 so that the current drawn by load 11 can be conducted longitudinally through the shell 31 thereby to heat the sensor 15 by resistive heating. It should be understood that, while the resistance of shell 31 is sufficient to produce heating under the heavy load currents drawn by a load such as an induction motor, its resistance is not so great that the voltage drop along the length of the sheath interferes with the obtaining of a usable signal beween leads 37 and 39.

Figure 3:
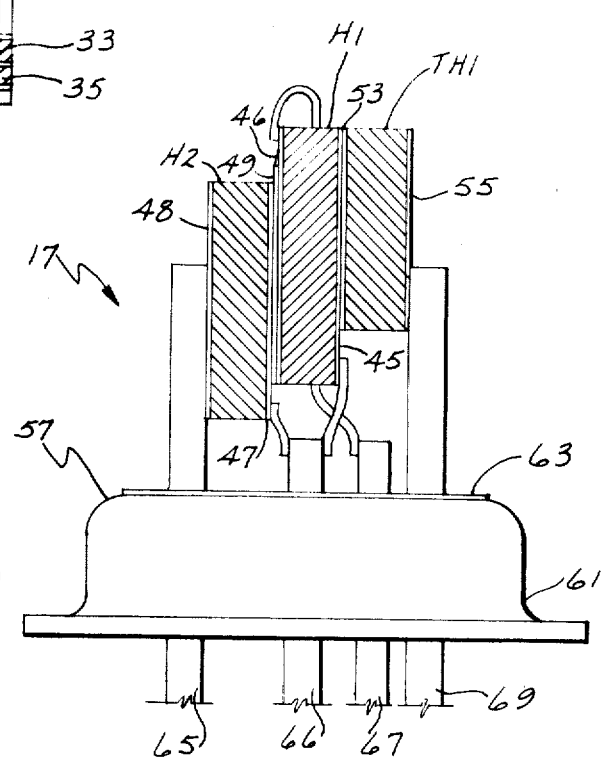
FIG. 3 is a side view of an electrothermal counter or accumulator employed in the system of FIG. 1.

The accumulator or counter 17 is illustrated in greater detail in FIG. 3. Counter 17 comprises two heaters H1 and H2 each of which comprises a small mass of a semiconductor or thermistor material. The material comprising heater H1 is of the PTC (positive temperature coefficient) type and preferably has a resistance characteristic in which the resistance of the material rises relatively abruptly at a relatively high transition temperature, e.g., 120° C. The material of heater H2 is also of the PTC type but has a lower transition temperature, e.g., about 80° C. Suitable electrodes 45–48 are applied on both sides of the masses of semiconductor material comprising the heaters H1 and H2. By means of these electrodes electrical connections may be made to the heaters. Heaters H1 and H2 are cemented to each other in heat exchange relationship with a thin film or layer 49 of an insulating material between them. Heaters H1 and H2 together thus comprise a body having a predetermined thermal inertia. Further, there is a delay before heat generated in one of the heaters can affect the other due to the presence of insulating layer 49. A sensing thermistor TH1 is cemented to the side of heater H1 which is opposite heater H2. Thermistor TH1 comprises a mass of semiconductor or thermistor material of the NTC type. Suitable electrodes 53 and 55 are applied to the mass of material comprising thermistor TH1 thereby to permit electrical connections to be made thereto. Thermistor TH1 thus comprises a part of the thermal body which includes heaters H1 and H2. The resistance of thermistor TH1 thus varies in response to the temperature of the body generally and more particularly to the temperature of the heater H1 to which it is closely coupled. This thermal body is mounted on a header 57 of the type typically employed in fabricating transistors or integrated circuits. Header 57 includes a base ring 61, a button 63 of insulating material and a plurality of leads 65–69 which extend through button 63 so as to be insulated from each other and from ring 61. The electrodes of heaters H1 and H2 and thermistor TH1 are connected to these leads so that these elements may be interconnected in the control circuitry described in greater detail hereinafter with reference to FIG. 4.

The operation of the accumulator or counter 17 is substantially as follows, it being assumed that the thermal body is initially at a relatively cool temperature, that is, well below the transition temperatures of both the heaters H1 and H2. When a signal of predetermined duration is applied to heater H1, it generates a corresponding amount of heat. This heat is transmitted essentially immediately to thermistor TH1 since this thermistor is directly in contact with H1. Thus the resistance of thermistor TH1 will reflect the heat generated by heater H1 each time such a signal is applied. The heat generated by heater H1 on the application of each such signal also tends to increase the temperature of the thermal body generally. The rate of dissipation of heat from the body is relatively slow as compared with the rate at which heat can be generated by heater H1 if a succession of such signals are applied to it and, accordingly, the thermal body tends to accumulate or integrate heat as successive signals are applied and the temperature of the body rises predictably.

As explained in greater detail hereinafter, heater H2 may be interconnected in a circuit supplying current so that heater H2 will heat regeneratively once its temperature reaches the corresponding transition level, i.e., 80° C. Regenerative heating occurs when the rise in temperature produced by a given amount of heat being generated causes the resistance of the heater H2 to increase to such an extent that the $I^2R$ consumption of power also increases so that even more heat is generated. Regenerative heating is thus a run-away condition in which the temperature of the heater rises abruptly to some limiting value determined by the circuit parameters.

Accordingly, as successive signals of predetermined energy are applied to heater H1 the temperature of the entire thermal body rises gradually as heat accumulates therein. However, when the transition temperature of heater H2 is reached, the regenerative heating thereby initiated causes the temperature of the body to rise abruptly indicating that the accumulated total of successive signals applied to heater H1 has exceeded a predetermined level. In effect the combination of H2 and R13 form an electrothermal bistable switch which can be reset after operation by momentarily opening switch SW1.

Figure 4:
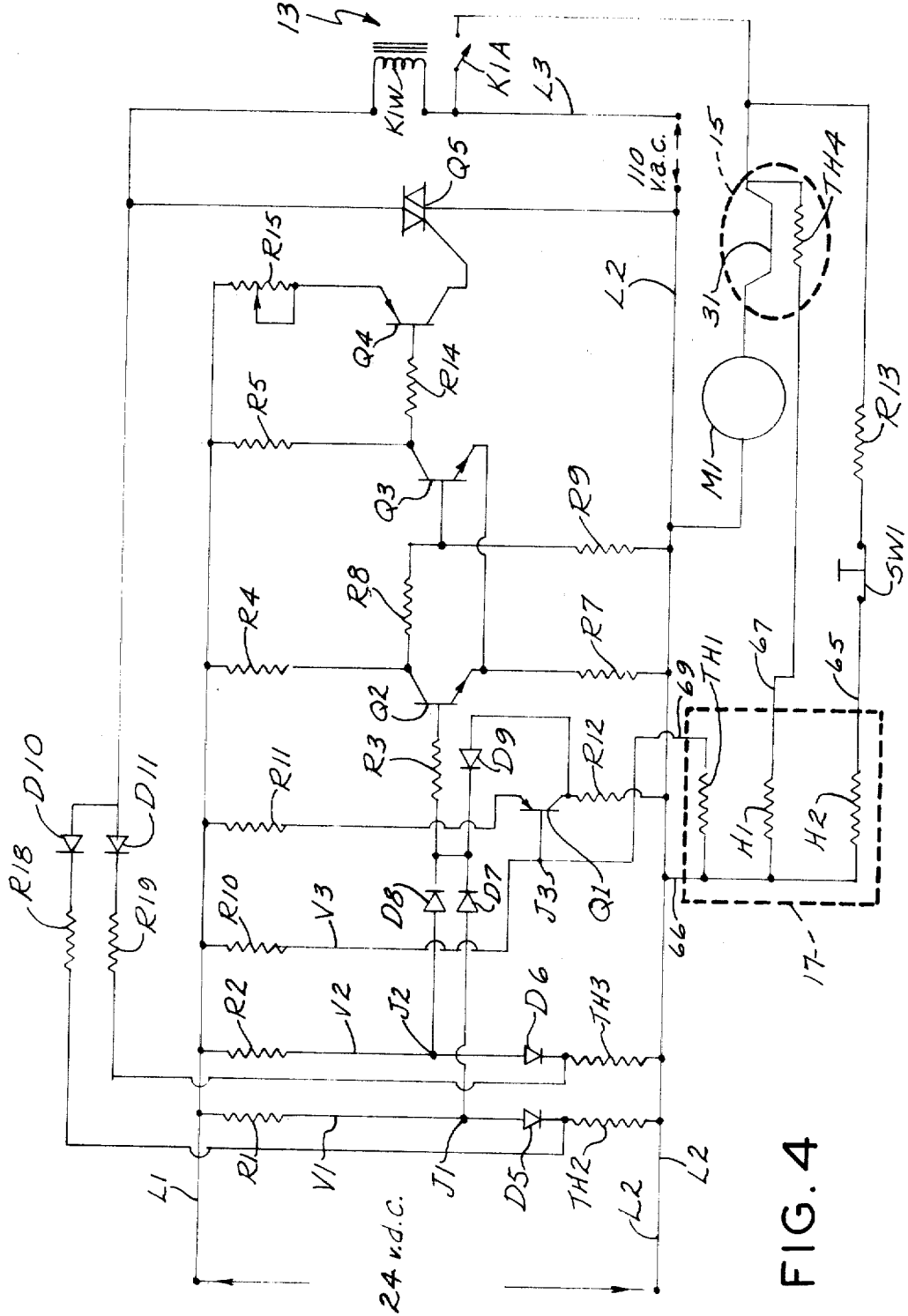
FIG. 4 is a schematic circuit diagram of the system of FIG. 1.

Referring now to FIG. 4, direct current, at a voltage suitable for transistor circuitry, e.g., 24 volts, is provided between a pair of supply leads L1 and L2. Connected across leads L1 and L2 are a pair of voltage dividers V1 and V2 each of which includes a respective PTC thermistor TH2 and TH3, a respective reference resistor R1 and R2, and a respective gating diode D5 and D6. Each of the dividers V1 and V2 has a junction, J1 and J2 respectively, which is between the respective thermistor and reference resistor. Voltage dividers V1 and V2 provide at these junctions control voltages which vary substantially as functions of the resistance of the respective thermistors. Thermistors TH2 and TH3 constitute the temperature sensor means 21 of FIG. 1. Assuming that the load 11 of FIG. 1 comprises an induction motor M1 in the exemplary circuitry of FIG. 3, thermistors TH2 and TH3 are preferably embedded in the motor windings so as to detect overheating thereof. Power for energizing motor M1, e.g., at 110 volts A.C. is provided between a supply lead L3 and lead L2.

Junctions J1 and J2 are connected, through respective blocking diodes D7 and D8 and a common current limiting resistor R3, to the base terminal of one (Q2) of a pair of NPN transistors Q2 and Q3 which are connected in a Schmitt trigger or level detecting circuit. The collectors of transistors Q2 and Q3 are connected to line L1 through respective load resistors R4 and R5 and their emitters are commonly connected to lead L2 through a resistor R7. The collector of transistor Q2 is also connected to the base terminal of transistor Q3 through a voltage divider comprising a pair of resistors R8 and R9.

As is understood by those skilled in the art, the trigger circuit comprising transistors Q2 and Q3 functions as a switching means and is operative to change from a first state in which Q2 is cut off and Q3 is conducting to a second state in which Q2 is conducting and Q3 is cut off when the voltage applied to the base of transistor Q2 passes a predetermined threshold moving toward more positive voltage levels.

The sensing thermistor TH1 in the accumulator or counter 17 is connected in a voltage divider V3 with a reference resistor R10 to provide at a junction J3 a voltage which varies as a function of the temperature of thermal mass comprising the counter. Junction J3 is connected to the base of a PNP transistor Q1. The emitter of transistor Q1 is connected to lead L1 through a resistor R11 and its collector is connected to lead L2 through a resistor R12. The collector of transistor Q1 is also connected, through a gating diode D9 and the resistor R3, to the base of transistor Q2 so that transistor Q1 can cause the Schmitt trigger to switch to its aforesaid second state when voltage divider V3 forward biases transistor Q1.

Heater H1 of the counter 17 is connected in series with the resistance of the temperature sensitive semiconductor material 35 in the current sensor 15, this resistance being designated thermistor TH4 in FIG. 4. Thus heater H1 is energized above a predetermined level when the temperature of the current sensor rises above the threshold of material 35 as described previously.

Heater H2 is connected in series with a resistor R13 and a switch SW1 between leads L2 and L3. The value of resistor R13 is chosen in relation to the A.C. motor supply voltage and the temperature dependent resistance characteristics of heater H2 so that the heater will heat regeneratively once its temperature is raised to a predetermined threshold, i.e., its transition temperature. As is understood by those skilled in the art, such regenerative heating can occur when the equilibrium current-voltage characteristic of a temperature dependent semiconductor element includes a negative resistance region as is the case with elements constructed of materials having a resistance which changes abruptly at certain temperatures. Therefore, bistable switching action occurs as a result of these conditions.

The collector of transistor Q3 is connected, through a resistor R14, to the base of a PNP transistor Q4 connected as a common emitter amplifying stage. The emitter of transistor Q4 is connected to line L1 through a gain adjusting rheostat R15 and its collector is connected to the gate of a triac Q5. Triac Q5 is a three-terminal semiconductor current switching device which, as understood by those skilled in the art, is operative to pass alternating current between its first and second anode terminals when triggering current of greater than a predetermined value is applied to its gate. Contactor 13 includes an operating winding K1W which is connected across leads L2 and L3 through a circuit which includes the anode terminals of triac Q5. When triac Q5 is triggered, winding K1W is thus energized directly from the A.C. supply leads L2 and L3. Contactor 13 also includes contacts K1A which are connected for energizing motor M1 from leads L2 and L3 through current sensor 15 when winding K1W is energized.

Current taken from between triac Q5 and winding K1W is applied, through respective current limiting resistors R18 and R19 and respective gating diodes D10 and D11, to the thermistors TH2 and TH3.

The operation of the circuit of FIG. 1 with respect to overheating of the motor M1 is as follows: Assuming that motor M1 is relatively cool, the thermistors TH2 and TH3 will also be relatively cool and will exhibit relatively low resistances in relation to the values of resistors R1 and R2. The voltages at junctions J1 and J2 are thus negative with respect to the threshold voltage of the Schmitt trigger circuit and diodes D7 and D8 are reverse biased. Transistor Q2 is thus cut off and transistor Q3 is conducting.

When transistor Q3 is conducting, transistor Q4 is forward biased and applies triggering current to the gate terminal of triac Q5. Triac Q5 is thus triggered into conduction and contactor K1 and motor M1 are energized. In this state, that is, when the triac Q5 conducts, virtually no voltage is developed across the two anode terminals and thus no heating current is applied through resistors R18 and R19 to the thermistors TH1 and TH2.

If motor M1 overheats, that is, if it reaches a temperature such that either of the thermistors TH2 or TH3 exhibits a relatively high resistance in relation to the value of the respective reference resistor, a voltage is developed at the respective junction J1 or J2 which is positive with respect to the trip threshold of the Schmitt trigger circuit. When this happens, the respective diode D7 or D8 is forward biased and transistor Q2 is forward biased into conduction. The Schmitt trigger circuit then reverses states so that the transistor Q2 is conducting and transistor Q3 is cut off.

When transistor 3 is cut off, bias current is drawn away from the base terminal of transistor Q4 which in turn cuts off the flow of triggering current to the gate terminal of triac Q5, thereby deenergizing contactor K1 and motor M1. In this state, that is, when triac Q5 ceases to conduct, the A.C. supply voltage appears across the anode terminals of the triac instead of winding K1W. During those A.C. half-cycles when the lead L3 is positive with respect to the lead L2, the voltage appearing across the anode terminals of triac Q5 forward biases or switches the diodes D10 and D11 so that current can flow through resistors R18 and R19 from the load circuit to the thermistors TH2 and TH3. This current, coming as it does from a relatively high voltage source, causes an appreciable so-called false heat to be generated internally within the thermistors, tending to drive them beyond the temperature at which they caused the motor M1 to be deenergized. This heating effect is regenerative with respect to heat emanating from the motor and thus prolongs the period over which the motor is deenergized following tripping of the control circuitry. Accordingly, the motor must cool to a substantially cooler temperature than that at which it was deenergized before it is reenergized by this control circuit. Thus, the response of this control circuit is modified by the introduction of a differential between those temperatures of the motor at which it is energized and deenergized. The magnitude of the differential may be adjusted by varying the values of resistors R18 and R19.

The operation of this circuit with respect to overload currents drawn by motor M1 is as follows: If excessive current is drawn by motor M1, the sensor 15 is heated by dissipation from the tubular shell 31. This increase in temperature causes a drop in the resistance of the semiconductor material 35 which reduces the thermistor resistance TH4 causing an increase in the current flowing through heater H1. The heat consequently generated by heater H1 is sensed by thermistor TH1 and the resultant drop in the resistance of thermistor TH1 causes transistor Q1 to be forward biased and to trip the Schmitt trigger comprising transistors Q2 and Q3. Tripping the Schmitt trigger deenergizes contactor K1 and the motor M1 as described previously with reference to the operation of the temperature sensing thermistors TH2 and TH3. As the heating of sensor 15 and heater H1 take a predetermined amount of time which can be preselected by varying the thermal masses of these elements, the apparatus does not trip or cause motor M1 to be deenergized during the time heavier currents are drawn during normal starting.

When motor M1 is thus deenergized, the sensing thermistor TH1 in the accumulator 17 cools down sufficiently after a predetermined delay to allow the Schmitt trigger to switch back to its original state and to reapply power to motor M1. If the fault has been cured in the meantime, the motor will remain energized. However, if the overload condition remains, e.g., if the rotor of motor M1 is locked, the heating of the current sensor will again cause the accumulator heater H1 to be energized thereby heating thermistor TH1 and again causing deenergization of motor M1. If the fault persists, this cycle may repeat several times, the heater H1 being energized for a substantially predetermined period on each try. As the cycle repeats, heat will gradually distribute through and accumulate in the thermal mass which comprises counter 17 until, after a predetermined count has been reached, the temperature of heater H2 reaches its threshold of regenerative heating. When H2 heats regeneratively, the thermal mass of counter 17 rises abruptly and is maintained at a relatively high temperature independently of the current passed by the sensor thermistor resistance TH4 to the heater H1. Accordingly, the thermistor TH1 will be kept at this relatively high temperature and will keep the motor M1 from being reenergized for an indefinite period.

The circuit may be manually reset to allow restarting of motor M1 by opening switch SW1 thereby cutting off the source of power from heater H2 allowing the thermal mass of counter 17 to cool down.

As semiconductor elements are used for sensing and sequencing in place of the electromechanical devices typically used, it can be seen that a relatively inexpensive and yet highly reliable operation is obtained.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for protecting an electrical load under overload conditions, said apparatus comprising:
   a sensor for sensing the current drawn by said load, said sensor including a resistance heater for generating an amount of heat which varies as a function of said load current and thermistor means responsive to the heat generated by said heater for providing a signal when said load draws an overload current;
   electrothermal counter means for counting successive occurrences of said signal, said electrothermal means including a second heater for generating heat in response to said signals and a second thermistor means responsive to the heat generated by said second heater means; and
   switching means controlled by said counter and responsive to the resistance of said second thermistor for deenergizing said load each time said second heater is energized above a predetermined level by one of said signals and for reenergizing said load a preselected number of times after said sensor cools down following deenergization of said load whereby under overload conditions said load is deenergized and then reenergized a preselected number of times and is then deenergized without being reenergized if the overload condition persists.

2. Apparatus as set forth in claim 1 wherein said sensor includes:
   an elongate electrode;
   a layer of semiconductor material around said electrode, said material having a resistance which varies with temperature;
   a tubular conductive shell surrounding said layer of semiconductor material and extending substantially coaxially with said electrode; and
   means for passing the load current through said shell thereby to heat said sensor to an extent which varies as a function of said current whereby the resistance between said electrode and said shell through said layer of semiconductor material varies as a function of said current.

3. Apparatus as set forth in claim 2 wherein said material has a negative temperature coefficient of resistivity and the resistance between said electrode and said shell is connected in series with said second heater thereby to energize said second heater above said predetermined level when said load draws an overload current.

4. Apparatus as set forth in claim 1 wherein said load is an electric motor, wherein said apparatus includes at least a third thermistor which is responsive to the temperature of said motor, and wherein said switching means is also responsive to the resistance of said third thermistor for deenergizing said motor if the temperature of said motor exceeds a preselected level.

References Cited

UNITED STATES PATENTS

| | | | |
|---|---|---|---|
| 3,258,647 | 6/1966 | Clark | 317—13 X |
| 3,457,460 | 7/1969 | Buiting et al. | 317—13 |

JAMES D. TRAMMELL, Primary Examiner

U.S. Cl. X.R.

317—23, 33, 41; 338—23